United States Patent
Sommers et al.

(10) Patent No.: US 12,063,140 B2
(45) Date of Patent: Aug. 13, 2024

(54) METHODS, SYSTEMS, AND COMPUTER READABLE MEDIA FOR TEST SYSTEM AGENT DEPLOYMENT IN A SMARTSWITCH COMPUTING ENVIRONMENT

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 85 days.

(21) Appl. No.: 17/977,458

(22) Filed: Oct. 31, 2022

(65) Prior Publication Data

US 2024/0146599 A1    May 2, 2024

(51) Int. Cl.
*H04L 41/046* (2022.01)
*H04L 41/12* (2022.01)
*H04L 41/14* (2022.01)

(52) U.S. Cl.
CPC ............ *H04L 41/046* (2013.01); *H04L 41/12* (2013.01); *H04L 41/14* (2013.01)

(58) Field of Classification Search
CPC ........ H04L 41/046; H04L 41/12; H04L 41/14
See application file for complete search history.

(56) References Cited

U.S. PATENT DOCUMENTS

| | | | |
|---|---|---|---|
| 7,899,846 | B2 | 3/2011 | Flynn et al. |
| 8,355,316 | B1 | 1/2013 | Lushear et al. |
| 8,458,111 | B2 | 6/2013 | Wolf et al. |
| 8,612,599 | B2 | 12/2013 | Tung et al. |
| 8,656,006 | B2 | 2/2014 | Cobb et al. |
| 8,869,107 | B2 | 10/2014 | Taylor et al. |
| 9,043,747 | B2 | 5/2015 | Eksten et al. |
| 9,110,703 | B2 | 8/2015 | Santos et al. |
| 9,154,327 | B1 | 10/2015 | Marino et al. |
| 9,276,812 | B1 | 3/2016 | Nagargadde et al. |

(Continued)

OTHER PUBLICATIONS

Davie, "SmartNICs, IPUs, DPUs de-hyped: Why and how cloud giants are offloading work from server CPUs," The Register, https://www.theregister.com/2021/11/24/infrastructure_processing_units/, pp. 1-4 (Nov. 24, 2021).

(Continued)

*Primary Examiner* — Minh Chau Nguyen

(57) ABSTRACT

Methods, systems, and computer readable media for test system agent deployment in a smartswitch computing environment are disclosed. One example method occurs at a test system, the method comprising: obtaining test information indicating a smartswitch or a data processing unit (DPU) of the smartswitch for testing in a smartswitch computing environment or at least one test system agent deployment factor, wherein the smartswitch includes a switch processor and DPUs; determining, using the test information and topology information about the smartswitch computing environment, at least one location for deploying at least one test system agent; and providing placement information indicating the at least one location for deploying the at least one test system agent to a target system or to a test system agent controller.

20 Claims, 5 Drawing Sheets

(56) References Cited

U.S. PATENT DOCUMENTS

| | | | |
|---|---|---|---|
| 9,471,463 | B1 | 10/2016 | Bates et al. |
| 9,575,732 | B2 | 2/2017 | Welicki et al. |
| 9,680,728 | B2 | 6/2017 | Besser |
| 9,875,087 | B2 | 1/2018 | Scholz et al. |
| 10,205,648 | B1 | 2/2019 | Guo et al. |
| 10,489,807 | B1 | 11/2019 | Arguelles |
| 10,515,000 | B2 | 12/2019 | Moretto et al. |
| 10,541,901 | B2 | 1/2020 | Raney |
| 10,671,520 | B1 | 6/2020 | Rodrigues et al. |
| 10,728,135 | B2 | 7/2020 | Raney |
| 10,764,169 | B2 | 9/2020 | Mircescu |
| 10,812,349 | B2 | 10/2020 | Raney et al. |
| 11,038,770 | B2 | 6/2021 | Raney |
| 11,489,745 | B2 | 11/2022 | Raney |
| 11,853,254 | B1 * | 12/2023 | Sommers ............... H01H 43/02 |
| 2004/0153863 | A1 | 8/2004 | Klotz et al. |
| 2005/0076113 | A1 | 4/2005 | Klotz et al. |
| 2006/0028999 | A1 | 2/2006 | Iakobashvili et al. |
| 2006/0075093 | A1 | 4/2006 | Frattura et al. |
| 2008/0192624 | A1 | 8/2008 | De Frias |
| 2010/0094981 | A1 | 4/2010 | Cordray et al. |
| 2011/0004698 | A1 | 1/2011 | Wu |
| 2011/0231552 | A1 | 9/2011 | Carter et al. |
| 2011/0307889 | A1 | 12/2011 | Moriki et al. |
| 2012/0079480 | A1 | 3/2012 | Liu |
| 2012/0185913 | A1 | 7/2012 | Martinez et al. |
| 2012/0210318 | A1 | 8/2012 | Sanghvi et al. |
| 2013/0031233 | A1 | 1/2013 | Feng et al. |
| 2013/0291109 | A1 | 10/2013 | Staniford et al. |
| 2014/0006597 | A1 | 1/2014 | Ganguli et al. |
| 2014/0026122 | A1 | 1/2014 | Markande et al. |
| 2014/0047272 | A1 | 2/2014 | Breternitz et al. |
| 2014/0047342 | A1 | 2/2014 | Breternitz et al. |
| 2014/0180664 | A1 | 6/2014 | Kochunni et al. |
| 2014/0215443 | A1 | 7/2014 | Voccio et al. |
| 2014/0229605 | A1 | 8/2014 | Besser |
| 2014/0278623 | A1 | 9/2014 | Martinez et al. |
| 2014/0278808 | A1 | 9/2014 | Iyoob et al. |
| 2015/0067404 | A1 | 3/2015 | Eilam et al. |
| 2015/0113132 | A1 | 4/2015 | Srinivas et al. |
| 2015/0263889 | A1 | 9/2015 | Newton |
| 2015/0319030 | A1 | 11/2015 | Nachum |
| 2016/0020981 | A1 | 1/2016 | Raney |
| 2016/0087859 | A1 | 3/2016 | Kuan et al. |
| 2016/0094383 | A1 | 3/2016 | Wang et al. |
| 2016/0094418 | A1 | 3/2016 | Raney |
| 2016/0094668 | A1 | 3/2016 | Chang et al. |
| 2016/0110211 | A1 | 4/2016 | Karnes |
| 2016/0248655 | A1 | 8/2016 | Francisco et al. |
| 2016/0269482 | A1 | 9/2016 | Jamjoom et al. |
| 2016/0277249 | A1 | 9/2016 | Singh et al. |
| 2016/0285685 | A1 | 9/2016 | Zhou et al. |
| 2016/0359888 | A1 | 12/2016 | Gupta et al. |
| 2016/0364307 | A1 | 12/2016 | Garg et al. |
| 2017/0093648 | A1 | 3/2017 | Elarabawy et al. |
| 2017/0099195 | A1 | 4/2017 | Raney |
| 2017/0118102 | A1 | 4/2017 | Majumder et al. |
| 2017/0163510 | A1 | 6/2017 | Arora et al. |
| 2017/0171033 | A1 | 6/2017 | Lucas et al. |
| 2017/0193448 | A1 | 7/2017 | Piyush et al. |
| 2017/0237633 | A1 | 8/2017 | Hegde et al. |
| 2017/0318053 | A1 | 11/2017 | Singh et al. |
| 2017/0353351 | A1 | 12/2017 | Cheng et al. |
| 2017/0374103 | A1 | 12/2017 | Testu |
| 2018/0041477 | A1 | 2/2018 | Shaposhnik |
| 2019/0044583 | A1 | 2/2019 | Garcia |
| 2019/0089617 | A1 | 3/2019 | Raney |
| 2019/0109777 | A1 | 4/2019 | Mircescu |
| 2019/0116110 | A1 | 4/2019 | Raney |
| 2019/0238422 | A1 | 8/2019 | Raney |
| 2019/0260651 | A1 | 8/2019 | Raney et al. |
| 2020/0159568 | A1 | 5/2020 | Goyal et al. |
| 2020/0356674 | A1 | 11/2020 | Nikolai et al. |
| 2024/0069099 | A1 * | 2/2024 | Sommers ......... G01R 31/31908 |

OTHER PUBLICATIONS

Notice of Allowance and Fee(s) Due for U.S. Appl. No. 16/653,961 (Jul. 1, 2022).

Non-Final Office Action for U.S. Appl. No. 16/653,961 (Mar. 18, 2022).

Final Office Action for U.S. Appl. No. 16/653,961 (Sep. 8, 2021).

Final Office Action for U.S. Appl. No. 15/729,061 (Feb. 6, 2020).

Notice of Allowance and Fee(s) Due for U.S. Appl. No. 15/709,433 (Oct. 18, 2019).

Commonly-Assigned, co-pending U.S. Appl. No. 16/653,961 for "Methods, Systems and Computer Readable Media for Providing a Declarative Network Monitoring Environment," (Unpublished, filed Oct. 15, 2019).

Non-Final Office Action for U.S. Appl. No. 15/729,061 (Oct. 10, 2019).

Notice of Allowance and Fee(s) Due for U.S. Appl. No. 15/709,433 (Aug. 23, 2019).

Non-Final Office Action for U.S. Appl. No. 15/709,433 (Apr. 8, 2019).

Commonly-Assigned, co-pending U.S. Appl. No. 16/251,019 for "Methods, Systems and Computer Readable Media for Triggering On-Demand Dynamic Activation of Cloud-Based Network Visibility Tools," (Unpublished, filed Jan. 17, 2019).

Commonly-Assigned, co-pending U.S. Appl. No. 16/219,888 for "Methods, Systems, and Computer Readable Media for Managing Deployment and Maintenance of Network Tools," (Unpublished, filed Dec. 13, 2018).

International Search Report and Written Opinion for International Patent Application Serial No. PCT/US2017/063909 (Mar. 1, 2018).

Commonly-Assigned, co-pending U.S. Appl. No. 62/625,321 for "Methods, Systems, and Computer Readable Media for Managing Cloud Deployment and Maintenance of Network Visibility Tools," (Unpublished, filed Feb. 1, 2018).

Commonly-Assigned, co-pending U.S. Appl. No. 15/729,061 for "Methods, Systems, and Computer Readable Media for Testing Virtual Network Components Deployed in Virtual Private Clouds (VPCs)," (Unpublished, filed Oct. 10, 2017).

Commonly-Assigned, co-pending U.S. Appl. No. 15/709,433 for "Methods Systems and Computer Readable Media for Optimizing Placement of Virtual Network Visibility Components" (Unpublished, filed Sep. 19, 2017).

"Kubernetes," Wikipedia, the free encyclopedia, https://en.wikipedia.org/wiki/Kubernetes, pp. 1-6 (Sep. 14, 2017).

"Ixia Cloudlens Private," Ixia, Data Sheet, 915-3736-01-6071 Rev A, pp. 1-15 (Aug. 21, 2017).

"IXNETWORK® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

"The ABCs of Network Visibility," Ixia, pp. 1-57 (Jul. 5, 2017).

"Managed Detection and Response," esentire, Gartner Press Release, pp. 1-11 (Mar. 14, 2017).

"Amazon Virtual Private Cloud VPC Peering Guide," Amazon Web Services, Inc., pp. 1-61 (2017).

Commonly-Assigned, co-pending U.S. Appl. No. 15/379,966 for "Instance Based Management and Control for VM Platforms in Virtual Processing Environments," (Unpublished, filed Dec. 15, 2016).

"Ixia Flex TapTM," Ixia, Document No. 915-6813-01 Rev B, pp. 1-5 (Oct. 2015).

"Ixia Phantom vTapTM with TapFlowTM Filtering," Ixia, Document No. 915-6805-01 Rev K, pp. 1-4 (Jul. 2015).

"Ixia xFilterTM," Ixia, Document No. 915-6804-01 Rev E, pp. 1-5 (May 2015).

Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).

Notice of Allowance for U.S. Appl. No. 15/783,715 (Mar. 18, 2020).

Final Office Action for U.S. Appl. No. 15/783,715 (Jan. 6, 2020).

Non-Final Office Action for U.S. Appl. No. 15/783,715 (Jul. 8, 2019).

(56) References Cited

OTHER PUBLICATIONS

Boeckman, Kelly, Docker containers vs. virtual machines: What's the difference? NetApp, Blog, 9 pgs. (accessed Jun. 16, 2017).

Bigelow, Stephen J., How do I find a VM host computer in a Microsoft or VMware environment?, 6 pgs. (accessed Jun. 12, 2017).

Kubernetes: Advanced Scheduling in Kubernetes, http://blog.kubernetes.io/2017/03/advanced-scheduling-in-kubernetes.html, 4 pgs. (May 22, 2017).

Shabeera, T.P. et al., "Optimizing VM allocation and data placement for data-intensive applications in cloud using ACO metaheuristic algorithm", Engineering Science and Technology, an International Journal, vol. 20, Issue 2, pp. 616-628 (Apr. 2017).

Redhat, Chapter 1. Get Started Orchestrating Containers with Kubernetes, 7 pgs. (accessed Jun. 7, 2017).

What's the Difference Between Containers and Virtual Machines?, http://www.electronicdesign.com/dev-tools/what-s-difference-between-containers-and-virtual-machines, 13 pgs., (accessed Jun. 16, 2017).

Ixia, Ixia xFilter, Data Sheet, 5 pgs. (May 2015).

Ixia, Ixia Phantom vTap with TapFlow Filter, Data Sheet, 4 pgs. (Jul. 2015).

Ixia, Ixia Flex Tap, Data Sheet, 5 pgs. (Oct. 2015).

Hofstede et al., "Flow Monitoring Explained: From Packet Capture to Data Analysis with NetFlow and IPFIX", IEEE, 31 pgs. (May 2014).

Wikipedia, "Kubernetes", Jul. 2017, 6 pgs.

Spirent White Paper, "NFV Validation Across Boundaries", 2015, 9 pgs.

"Cloud-Based Deployment of Network Test Tools", IP.Com Pub. Id. IPCOM000254477D (Jul. 3, 2018).

* cited by examiner

400

| TEST AGENT PLACEMENT FACTOR(S) | SUT RELATED DATA (E.G., TOPOLOGY DATA, TARGET SYSTEM DATA) | TEST AGENT PLACEMENT INFORMATION |
|---|---|---|
| GROUP '1' | TOPOLOGY A: SS 1 | TGA: OUTSIDE NETWORK, TMA: DPU D, TMA: DPU K |
| GROUP '1' | TOPOLOGY B: SS 1 | TGA: INSIDE NETWORK, TMA: DPU B |
| GROUP '2' | TOPOLOGY A: SS 1 | TGA: DPU A, TMA: DPU A |
| GROUP '2' | TOPOLOGY B: SS 1 | TGA: DPU A, TMA: DPU B |
| GROUP '2' | TOPOLOGY C: SS 2 | TGA: DPU A, TMA: DPU H |
| GROUP '3' | TOPOLOGY B: SS 2 | TMA: INSIDE NETWORK, TGA: DPU D, TGA: DPU K STOP AGENT: DPU C |

FIG. 4

METHODS, SYSTEMS, AND COMPUTER READABLE MEDIA FOR TEST SYSTEM AGENT DEPLOYMENT IN A SMARTSWITCH COMPUTING ENVIRONMENT

TECHNICAL FIELD

The subject matter described herein relates to network testing and/or monitoring. More specifically, the subject matter relates to methods, systems, and computer readable media for test system agent deployment in a smartswitch computing environment.

BACKGROUND

Data center environments or large scale computing environment typically provide high reliability and security and typically include networked resources (e.g., virtual or physical servers connected via network switches) sharable by multiple clients of the data center operator and may utilize software defined network (SDN) and/or virtualization. In some computing environments, an SDN or other network may utilize smartswitches. For example, a smartswitch may include a main processor (e.g., a central processing unit (CPU)), a switch processor (e.g., a switching application-specific integrated circuit (ASIC)), and multiple DPUs (e.g., programmable processors that allows the user to program a respective processing pipeline for specific processing tasks) and may act as a top of rack (ToR) switch in a switching fabric. In this example, two or more smartswitches or DPUs thereof may be configured for high-availability (HA), where HA related traffic (e.g., keep-alive messages, HA sync message, or failover messages, etc.) may be communicated between the smartswitches such that if a smartswitch fails the other smartswitch can handle the failed smartswitch's workload with little to no downtime. While HA related traffic and/or other traffic may be communicated between smartswitches or DPUs therein, communications to or from DPUs of the smartswitches are generally internal and, as such, monitoring and testing DPU traffic or related functions can be difficult, tedious, and/or inefficient. Moreover, for test systems that can insert or implement test system agents (e.g., a traffic generation agent and/or a traffic monitoring agent) at various points or nodes in a smartswitch computing environment, the location or placement of such test system agents can significantly affect test performance and/or test results.

SUMMARY

Methods, systems, and computer readable media for test system agent deployment in a smartswitch computing environment are disclosed. One example method occurs at a test system, the method comprising: obtaining test information indicating a smartswitch or a data processing unit (DPU) of the smartswitch for testing in a smartswitch computing environment or at least one test system agent deployment factor, wherein the smartswitch includes a switch processor and DPUs; determining, using the test information and topology information about the smartswitch computing environment, at least one location for deploying at least one test system agent; and providing placement information indicating the at least one location for deploying the at least one test system agent to a target system or to a test system agent controller.

One example system includes a test system implemented using at least one processor and a memory, the test system configured for: obtaining test information indicating a smartswitch or a DPU of the smartswitch for testing in a smartswitch computing environment or at least one test system agent deployment factor, wherein the smartswitch includes a switch processor and DPUs; determining, using the test information and topology information about the smartswitch computing environment, at least one location for deploying at least one test system agent; and providing placement information indicating the at least one location for deploying the at least one test system agent to a target system or to a test system agent controller.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 4 illustrates example placement determination data usable for determining locations for deploying or inserting TSA(s) in a smartswitch computing environment.

DETAILED DESCRIPTION

Figure 1:
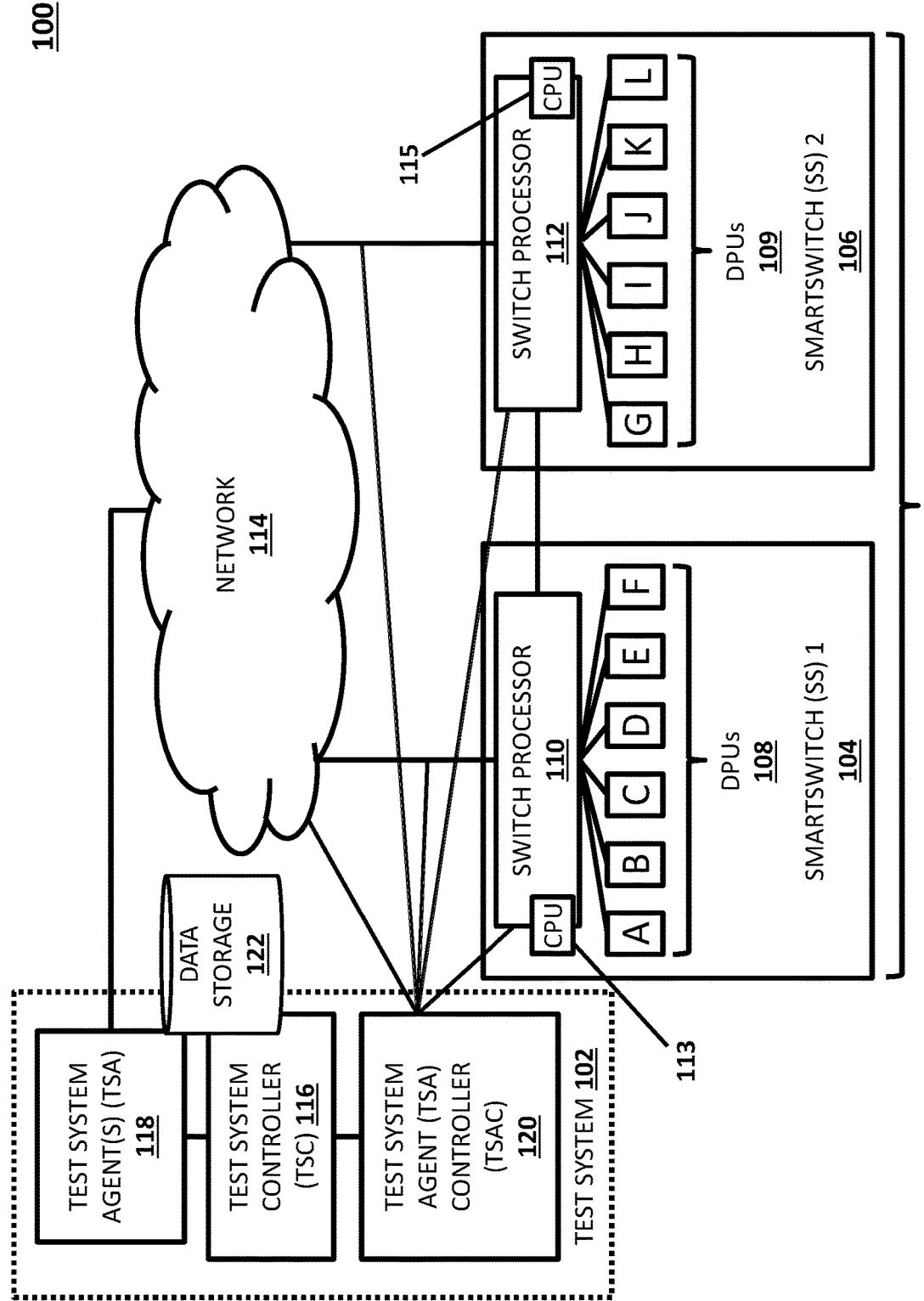
FIG. 1 is a diagram illustrating an example smartswitch computing environment comprising one or more smartswitches.

The subject matter described herein includes methods, systems, and computer readable media for test system agent deployment in a smartswitch computing environment. Smartswitches may be devices that include a main processor (e.g., a central processing unit (CPU), a switch processor (e.g., a switching application-specific integrated circuit (ASIC) or a programmable switching chip) and multiple DPUs (e.g., smart network interface cards (SmartNICs), infrastructure processing units (IPUs), etc.) for performing one or more processing tasks. The DPUs and/or other entities in a particular smartswitch may be connected via high-speed, internal links (e.g., using a Ethernet based serdes transmission system, an internal switch fabric, a communications bus, or another transmission system) and traffic communicated between two DPUs in the smartswitch may traverse one or more these internal link(s), e.g., without this intra-switch traffic traversing using external Ethernet links.

However, communications between a smartswitch (or DPU(s) therein) and an external entity (e.g., a second smartswitch or DPU(s) therein) may be notable slower than solely internal communications because such traffic traverses external Ethernet links accessible via the smartswitch's switch processor. For example, inter-smartswitch packet traffic may be communicated over 100 gigabits per second (Gbps) Ethernet links in a data center environment. In this example, a packet processed or generated by a DPU in a first smartswitch may transit an Ethernet-like internal fabric link to a switch processor and the switch processor may direct the packet to an egress network interface card (NIC) or other entity of the smartswitch, where the packet is transmitted via an external, egress Ethernet link to a second smartswitch for processing by a DPU therein. Continuing with this example, the second smartswitch may receives the packet and communicate (via an internal link or transmission system) the packet to its switch processor, where the switch processor directs or sends the packet a DPU therein for processing, e.g., via an internal link. As such, traffic in a smartswitch computing environment can involve internal and external link resources of a smartswitch and, as such, usage of these resources can affect communications speed and, as such, related performance. Hence, for test systems that can insert or implement test system agents (e.g., a traffic generation agent (TGA) and/or a traffic monitoring agent (TMA)) at various locations (e.g., network nodes, smartswitches, DPUs, etc.) in a smartswitch computing environment, the location or placement of test system agents can significantly impact test performance (e.g., if placement results in excessive or inefficient utilization of SUT resources) and/or test results. Accordingly, it can be beneficial to select or determine appropriate (e.g., optimized) locations for various test system agents based on user-provided agent deployment factors (e.g., a desire to minimize using external links to transmit test traffic and/or related test feedback information, a desire to execute a traffic generator from a DPU in a same smartswitch where another DPU is to be tested, etc.), a test environment topology (e.g., the number and/or bandwidth of links connecting a smartswitch to a related network or other smartswitch), or other information (e.g., entities in a test environment capable of executing particular test system agents).

In accordance with some aspects of the subject matter described herein, techniques, methods, or mechanisms are disclosed for test system agent deployment in a smartswitch computing environment. For example, a test system or a related entity therein (e.g., a software defined network (SDN) controller, a test system controller, a network monitoring system controller, a network packet broker controller, etc.) in accordance with aspects described herein may obtain test information indicating a smartswitch or a data processing unit (DPU) of the smartswitch for testing in a smartswitch computing environment (e.g., a switching fabric comprising one or more smartswitches) or at least one test system agent deployment factor; determining, using the test information and topology information about the smartswitch computing environment, at least one location for deploying at least one test system agent; and providing placement information indicating the at least one location for deploying the at least one test system agent to a target system or to a test system agent controller.

Advantageously, in accordance with some aspects of the subject matter described herein, test systems or other systems may be improved by determining appropriate (e.g., optimized, preferred, or meets one or more user-specified test objectives) test system agent deployment in a smartswitch computing environment. For example, a test system or a related controller may utilize placement factors (e.g., target system requirements) and other information (e.g., a user-specified smartswitch to test or use in implementing a test system agent and/or SUT or test environment topology information) in determining optimized locations for one or more test system agents TSA(s), e.g., appropriate locations that meet or satisfy user-specified placement factors and/or are applicable for a given test environment and/or test scenario.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example smartswitch computing environment 100 comprising one or more smartswitches. Environment 100 may include one or more networks and/or one or more computer platforms, nodes, or devices. For example, environment 100 may include a test system 102 and one or more devices or systems under test (SUT), e.g., smartswitch (SS) 104, a SS 106, and/or a network 114 (e.g., a data center architecture or switch fabric) connected to SS 104 and SS 106.

Each of SS 104 and SS 106 may represent a computing system (e.g., one or more devices, platforms, etc.) for performing switching functions and/or various other processing tasks. For example, each of SS 104 and SS 106 may include a main central processing unit (CPU) (e.g., CPU 113 or 115) for handing management or operating system tasks, a switch processor (e.g., switch processor 110 or 112) for performing switching tasks associated with forwarding traffic to or from DPUs therein (e.g., DPUs 108 or DPUs 109), where each DPU may perform one or more processing tasks. In this example, communications between entities of SS 104 or SS 106 may utilize high-speed, internal links (e.g., using an Ethernet based serdes transmission system, an internal switch fabric, a communications bus, or another transmission system).

In some embodiments, switch processor 110 or 112 may represent or include a fixed-function ASIC switch, a programmable ASIC switch, or a switch chip. In some embodiments, switch processor 110 or 112 may include or interact with a respective main CPU (e.g., CPU 113 or 115). For example, switch processor 110 may include or interact with CPU 113 for receiving instructions from test system 102 or a related entity (e.g., a smartswitch controller) and for configuring switching resources or related functionality, e.g., via SONiC configuration commands, routing rule updates, or other instructions.

In some embodiments, SS 104 or SS 106 (or DPUs therein) may be SONiC based entities and/or may utilize disaggregated application programming interfaces (APIs) for SONiC Hosts (DASH). For example, each of DPUs 108 or 109 may run a subset of SONiC functions but lack some common control functions. In this example, CPU 113 or 115 may run an enhanced version of SONiC that include common control functions or a different subset of SONiC than DPUs 108 or 109. Continuing with this example, an SDN controller or other entity may configure a high-availability (HA) configuration between DASH DPUs (e.g., where each DPU in SS 104 has a high-availability DPU peer in SS 106) and may set up or configure routes for HA messages (e.g., heartbeat messages, state messages, etc.) and/or routes for other traffic. In this example, the SDN controller or other entity may be configured to handle failures of single DPU cards, DPU-ToR links, an entire chassis full of DPUs, or of one smartswitch.

In some embodiments, DPUs of a given smartswitch (e.g., DPUs 108 of SS 104) may be addressable via a network address or related information (e.g., an API endpoint address or an API endpoint address and a port number). In such embodiments, traffic (e.g., messages) destined for a particular DPU may be received, e.g., by a respective switch processor or a related CPU via routing or proxying the network address or related information.

Test system 102 may include a computer system (e.g., one or more computing platforms, nodes, or devices) associated with testing a SUT (e.g., environment 100 including SS 104 and/or SS 106). For example, test system 102 may generate and send traffic to a SUT and/or receive traffic from the SUT and may analyze one or more performance aspects associated with the SUT. In some embodiments, a SUT may include network 114 connected to SS 104 and SS 106, where each of SS 104 and SS 106 are serving as top of rack (ToR) switches, leaf switches or spine switches.

In some embodiments, test system 102 can be implemented using a stand-alone tool, a testing device, a network equipment test device or platform, or software executing on one or more processor(s). Test system 102 may be a single device or node or may be distributed across multiple devices or nodes. In some embodiments, test system 102 includes one or more modules for performing various test related functions. For example, test system 102 may install or deploy software-based or hardware-based agents in environment 100 for performing various test related tasks, such as a traffic (e.g., packet) generator for generating test traffic and/or a traffic probe agent for observing traffic sent to or from a particular entity, e.g., SS 106 or DPUs 109.

In some embodiments, test system 102 may include a test system controller (TSC) 116, one or more test system agent(s) (TSA) 118, one or more test system agent controller(s) (TSAC) 120, and data storage 122.

TSC 116 may be any suitable entity or entities (e.g., software executing on a processor, a field-programmable gateway array (FPGA), and/or an ASIC or a programmable ASIC (e.g., P4-programmable ASIC), or a combination of software, an FPGA, and/or an ASIC) for performing one or more aspects associated with configuring and testing a SUT (e.g., SS 104 or DPUs 108) and/or various aspects thereof. In some embodiments, TSC 116 may be implemented using one or more processors and/or memory. For example, TSC 116 may utilize one or more processors (e.g., executing software stored in memory) to generate traffic patterns or scenarios for various message streams (e.g., flows or sessions) and configure TSA(s) 118 to generate and send traffic based on these patterns or scenarios. In another example, TSC 116 may also utilize one or more processors to perform or initiate various tests and/or analyses involving test packets and/or related responses from DPUs 108 or other entities under test. TSC 116 may send instructions to various modules or entities, e.g., TSAs 118 or TSAC 120, of test system 102 for controlling (e.g., to pause, (re)start, or stop) a test session.

In some embodiments, TSC 116 may interact with or include TSAC 120 for configuring, deploying, and/or managing TSA(s) 118. TSAC 120 may be any suitable entity or entities (e.g., software executing on a processor, an ASIC, an FPGA, or a combination of software, an ASIC, or an FPGA) for controlling and/or deploying one or more TSA(s) in environment 100. For example, TSAC 120 may include a smartswitch controller or an SDN controller or related functionality for deploying various TSA(s) 118 in environment 100 and/or performing various management tasks.

TSA(s) 118 may be any suitable entity or entities (e.g., software executing on a processor, an ASIC, an FPGA, or a combination of software, an ASIC, or an FPGA) for performing one or more test related tasks. For example, TSA(s) 118 may include software or logic for generating and/or sending test traffic, for monitoring observing traffic during testing, for stopping or pausing a test (e.g., based on preconfigured criteria being met), and/or for collecting test results or related information, e.g., from various TSA(S) 118. In some embodiments, some TSAs 118 may be deployed on one or more external or stand-alone device(s) and may be configured for generating test traffic. In another example, one TSA 118 may be deployed (e.g., installed) on DPU C in SS 104 for monitoring its internal smartswitch traffic and another TSA 118 may be deployed in DPU C (or another DPU) in SS 104 for sending test traffic directly to DPUs in SS 104.

In some embodiments, TSA(s) 118 may be connected to one or more entities in environment 100. For example, e.g., where TSA 118 is an external device connected to network 114 or a module executing on a node in network 114, TSA 118 may be instructed (e.g., by TSC 116) to initiate a test session by sending test traffic to SS 104 and SS 106 via network 114. In another example, e.g., where TSA 118 is software executing on one or more DPUs of SS 104 and SS 106, TSA 118 may be instructed (e.g., by TSC 116) to initiate a test session by sending test traffic to SS 104 and SS 106 directly or via network 114.

In some embodiments, TSA(s) 118 may be configurable by test system 102 to perform various aspects of traffic generation and related reporting. For example, test system 102 or a related entity (e.g., TSC 116 or TSAC 120) may configure TSA 118 to generate test traffic directed to a particular DPU or smartswitch of interest and to report various traffic generation related metrics or other metrics to TSC 116 or a related entity periodically (e.g., every five minutes) or aperiodically (e.g., dynamically, on request, or after a test session or test run is completed).

In some embodiments, TSA(s) 118 may be configurable by test system 102 to perform various aspects of traffic monitoring and reporting. For example, test system 102 or a related entity (e.g., TSC 116 or TSAC 120) may configure TSA 118 to monitor network traffic and to report various traffic related metrics to TSC 116 or a related entity periodically (e.g., every five minutes) or aperiodically (e.g., dynamically, on request, or after a test session or test run is completed). In another example, test system 102 or a related entity (e.g., TSC 116 or TSAC 120) may configure TSA 118 to collect reports or metrics from TSAs deployed in environment 100 and to generate reports or other information based on the collected information. In another example, TSA 118 may be configured to interceptor observe original traffic traversing various links in environment 100 and/or to receive or obtain data (e.g., copies of traffic, traffic portions, metrics, or other information) from test related entities, intermediate nodes, or one or more SUTs (e.g., SS 104 and SS 106).

In some embodiments, TSA(s) 118 may be configurable by test system 102 to manage (e.g., start, stop, or pause) testing. For example, test system 102 or a related entity (e.g., TSC 116 or TSAC 120) may configure TSA 118 to act as a stop test execution agent (e.g., a "circuit breaker") when observed or derived metrics exceed acceptable threshold values (e.g., user-configured or predetermined limits). In this example, TSA 118 may be configured to monitor resource usage metrics (e.g., CPU utilization, memory usage, network or link congestions, switching ASIC queue depths, etc.) in environment 100 (or entities thereof) and to abort or pause a test session if the monitored resource usage exceeds a predetermined threshold value (e.g., by sending a signal to stop subsequent test traffic from being generated or sent by TGAs). Continuing with this example, e.g., if testing is performed in a production environment, "circuit breaker" functionality can provide significant benefits since test system 102 would have the ability to monitor performance conditions in a production network in real-time or near real-time, while preventing or mitigating testing from significantly degrading the production network's operational performance.

In some embodiments, test system 102 or related entities may be configured to test high-availability (HA) configurations between HA peers, e.g., SS 104 and SS 106 or DPUs therein. For example, test system 102 or TSC 116 may configure TSAs 118 to test HA aspects involving SS 104 and SS 106 or DPUs therein. In this example, test system 102 or related entities may test failover detection, related failover performance, and/or other aspects by monitoring one or more links via TSA 118. In another example, test system 102 or related entities may test or monitor a DASH HA configuration by using one or more TSA(s) 118 for monitoring HA related messages (e.g., DPU-DPU traffic, such as HA sync or failover messages) from DPUs 108 of SS 104 and determining whether the information is processed appropriately, e.g., by updating a route, withdrawing a route, updating an active flow table entry, or the like.

In some embodiments, test system 102 or related entities (e.g., TSC 116 and/or TSAC 120) may determine appropriate (e.g., optimized, preferred, or meets one or more user-specified test objectives) locations for deploying TSA(s) 118 (e.g., TGAs and/or TMAs) within environment 100 (e.g., a data center infrastructure comprising SS 104 and SS 106) and for facilitating deployment at these locations. For example, test system 102 or related entities may receive user-specified test information (e.g., a declarative or intent-based test goal or objective, a specific smartswitch requirement, a specific DPU of a smartswitch requirement, etc.) associated with testing smartswitch computing environment 100 or entities therein (e.g., SS 104 and SS 106). In this example, test system 102 or a related entity may identify a DPU or smartswitch of interest (e.g., a target system) within environment 100, e.g., if the received test information does not explicitly indicate a DPU or smartswitch of interest. Continuing with this example, test system 102 or a related entity may use various information (e.g., test information and/or environment information) to determine a location for deploying TSA 118 (e.g., the same smartswitch as the smartswitch of interest); and may provide agent deployment information (e.g., configuration instructions) indicating the location for deploying TSA 118 to a target system (e.g., SS 104 or a DPU therein) or to TSAC 120 (e.g., a smartswitch controller or an SDN controller).

In some embodiments, test system 102 or related entities (e.g., TSC 116 and/or TSAC 120) may utilize user input or other placement determination information for determining type(s) of TSA(s) 118 to deploy and/or appropriate locations for their deployment. For example, TSC 116 or TSAC 120 may access SUT related data (e.g., environment topology information) to identify a smartswitch or DPU of interest (e.g., a target system for implementing TSA(s) 118 and/or a system to be tested). In this example, TSC 116 or another entity may determine an appropriate location (e.g., a target DPU or smartswitch) that meets one or more (e.g., some or all) user-specified agent placement factors.

In some embodiments, an agent deployment factor may include a predicted SUT resource usage value (e.g., TSA should use 30% or less of the processing resources of a DPU in a smartswitch during testing); a predicted bandwidth consumption value (e.g., test feedback or TSA traffic should be less than 10% of the traffic on a particular external link or set of links during testing); a predicted latency value (e.g., TSA should be placed so that latency does not increase by more than 30%); a predicted memory consumption value (e.g., TSA should use 40% or less of the memory resources of a target system during testing), or a predicted shared resource balance value (e.g., TSA should use 50% or less of the shared resources of a target system during testing). In some embodiments, an agent deployment factor may include a goal or intent of a test operator and may relate to minimizing or maximizing utilization of various resources, e.g., minimizing external inter-smartswitch link bandwidth consumption by test related traffic, minimizing smartswitch internal fabric link bandwidth consumption by test related traffic, minimizing congestion or queue depth of a smartswitch or a switch processor (e.g., a switching ASIC or programmable switch) thereof, minimizing CPU utilization, minimizing DPU utilization, or minimizing memory consumption. In some embodiments, an agent deployment factor may include a practical or functional requirement for selecting a target system, e.g., determining that the target system is capable of performing its expected workload in addition to implementing TSA 118.

In some embodiments, test system 102 or related entities (e.g., TSC 116 and/or TSAC 120) may determine one or more appropriate locations for TSA(s) 118 using predetermined or dynamically generated agent deployment strategy, e.g., an algorithm for identifying a location for deploying TSA(s) 118 that meet or satisfy the highest number of relevant agent deployment factors or that meet or satisfy the highest priority agent deployment factor. For example, if it is determined that switch processor 110 of SS 104 in environment 100 is to be tested, test system 102 or a related entity may determine an agent deployment strategy based on a user-specified resource usage or performance optimization goal of "minimizing external link bandwidth consumption by TSA-generated traffic". In this example, test system 102 may analyze SUT topology information and determine, for example, that one or more TSA(s) 118 should be placed (e.g., installed or deployed) directly on a smartswitch of interest (e.g., SS 104) or potentially on a specific DPU(s) in the smartswitch (e.g., DPU B). Continuing with this example, if test system 102 determines that if TSA(s) 118 cannot be placed directly on the smartswitch of interest then test system 102 may determine that TSA(s) 118 should be placed on an adjacent or nearest smartswitch (e.g., SS 106), thereby minimizing external link usage in environment 100 when test traffic generated by TSA(s) 118 is sent to SS 104 or DPUs therein. It will be appreciated that the "minimizing external link bandwidth consumption by TSA-generated traffic" optimization goal is one example of a resource usage or performance optimization goal.

In some embodiments, test system 102 or related entities (e.g., TSC 116 and/or TSAC 120) may utilize an orchestration module or related functionality for determining appropriate locations for TSA(s) 118 and/or performing deployment of TSA(s) 118. For example, TSC 116 may use various information to determine placement information indicating a location for deploying TSA(s) 118. In this example, placement information may include smartswitch affinity information, e.g., a DPU identifier, for indicating to TSAC 120 (e.g., an orchestration module or node) a location for deploying TSA(s) 118 in environment 100 and then TSAC 120 may provide instructions and/or other information for deploying TSA(s) 118 in accordance with the placement information. In another example, e.g., where TSC 116 includes TSAC 120 or related functionality, TSC 116 may directly orchestrate deployment of TSA(s) 118 in environment 100.

In some embodiments, after deploying TSA(s) 118 to appropriate locations in environment 100, test system 102 or related entities (e.g., TSC 116 and/or TSAC 120) may initiate or execute one or more test sessions, where each TSA 118 performs its respective test related task(s), e.g., logging and/or reporting performance metrics associated with a smartswitch of interest, a DPU of interest, or other aspects of environment 100.

In some embodiments, test system 102 or related entities (e.g., TSC 116 and/or TSAC 120) may access or utilize data storage 122. Data storage 122 may represent any suitable entity (e.g., a computer readable medium, a database, a storage device, or memory) for storing test configuration data, test session data, test results, traffic patterns, traffic or workload templates, received traffic metrics, SUT related data (e.g., topology information, connection information, etc.), agent deployment factors (e.g., user-specified test objectives that may be used in determining locations for deploying TSAs 118), and/or other data. For example, data storage 122 may store test configuration information and/or connection data indicating how test system 102 and related test system entities are connected to one or more links or devices associated with testing a SUT (e.g., SS 104 and SS 106). In another example, data storage 122 may store information for determining locations for inserting or deploying various types of TSAs 118.

It will be appreciated that FIG. 1 is for illustrative purposes and that various depicted entities, their locations, and/or their functions described above in relation to FIG. 1 may be changed, altered, added, or removed.

Figure 2:
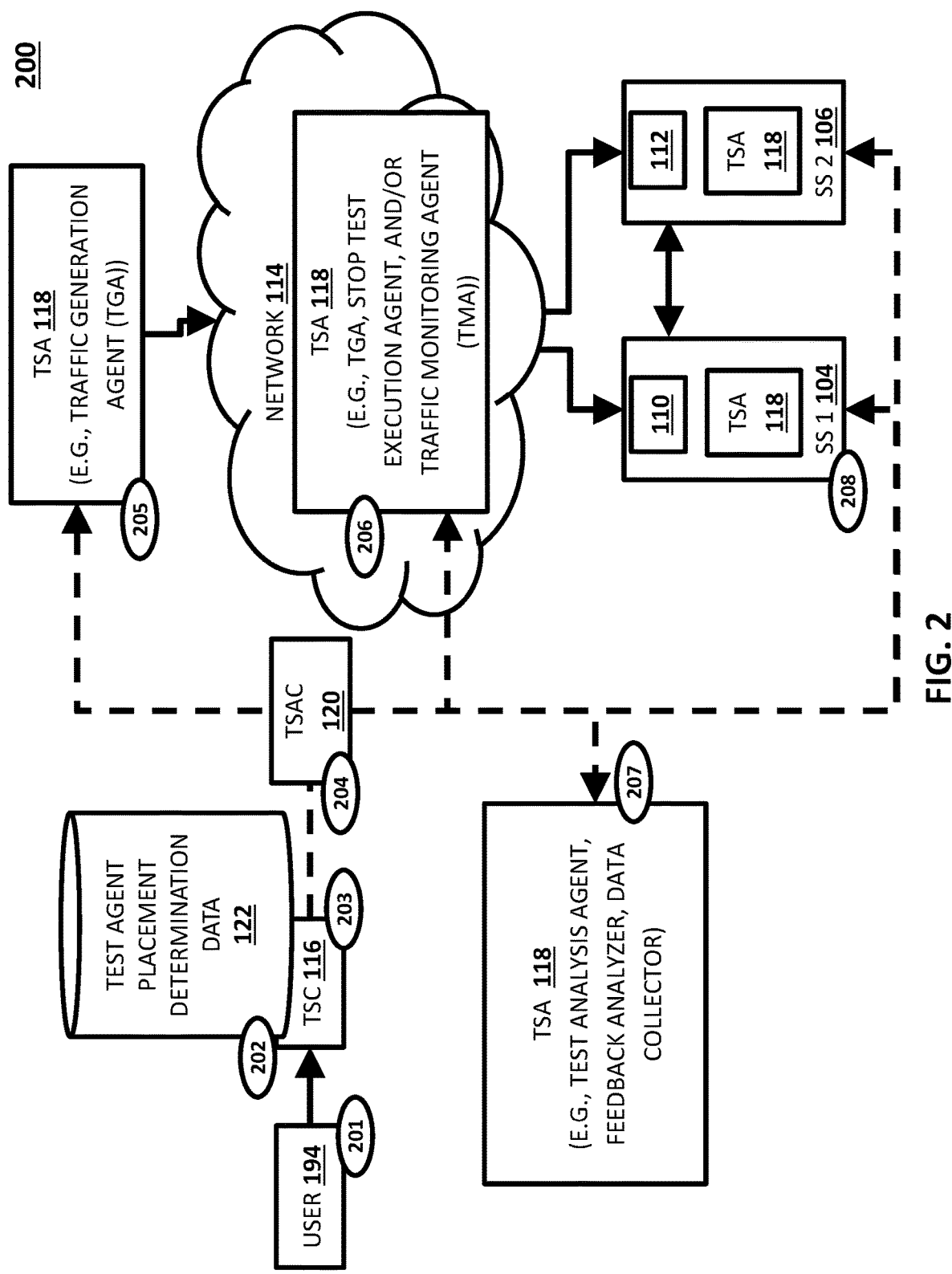
FIG. 2 illustrates an example scenario where test system agents (TSAs) are selected and deployed in a smartswitch computing environment.

FIG. 2 illustrates an example scenario 200 where TSAs 118 are selected and placed (e.g., inserted, configured, initialized, or deployed) in various locations (e.g., target systems) of smartswitch computing environment 100. For example, test system 102 or a related entity may receive user-specified test information (e.g., a declarative or intent-based test goal or objective, a specific smartswitch requirement, a specific DPU of a smartswitch requirement, etc.) associated with testing smartswitch computing environment 100 or entities therein (e.g., SS 104 and SS 106). In this example, test system 102 or a related entity may identify a DPU or smartswitch of interest (e.g., a target system) within environment 100, e.g., if the received test information does not explicitly indicate a DPU or smartswitch of interest. Continuing with this example, test system 102 or a related entity may use various information (e.g., test information and/or environment information) to determine a location for deploying TSA 118 (e.g., the same smartswitch as the smartswitch of interest); and may provide agent deployment information (e.g., configuration instructions) indicating the location for deploying TSA 118 to a target system (e.g., SS 104 or a DPU therein) or to TSAC 120 (e.g., a smartswitch controller or an SDN controller).

Referring to scenario 200, in step 201, e.g., during test session configuration, user 194 (e.g., a test system operator) may provide agent deployment goals or other information to TSC 116. For example, user 194 may directly specify a DPU or smartswitch of interest via a test system provisioning API or other user interface. In another example, user 194 may specify a test intent or other declarative type test objective or goal (e.g., a test goal or objective of "test IPv6 processing capabilities in data center") and have test system 102 automatically determine a smartswitch of interest or a specific DPU of interest in a smartswitch.

In step 202, TSC 116 or a related entity (e.g., an agent deployment module) may receive and utilize user input in determining locations for deploying various TSAs 118 to test a SUT, e.g., SS 104 or a DPU of SS 104.

In some embodiments, when determining one or more optimized or appropriate locations for different TSAs 118, TSC 116 or a related entity may obtain agent placement determination information (e.g., SUT and/or network related information, topology information, smartswitch device identifier information, DPU element identifier information, DPU IP address information, routing table information, SUT configuration data, DPU element usage or utilization information, etc.) stored in data storage 122. For example, after receiving user input, TSC 116 or a related entity may need additional details about environment 100 including information about SS 104 or SS 106 to determine appropriate TSAs 118 or locations to deploy TSAs 118. In this example, assuming that the user input indicates a SUT resource usage goal of minimizing the amount of test system generated synthetic traffic that transits external links within environment 100, TSC 116 or a related entity may use obtained topology information to determine that a TGA should be located or placed on an available or unused DPU of SS 104 and, as such, test traffic for testing SS 104 or a DPU therein will not consume external link bandwidth within network.

In another example, where user input indicates a particular DPU or smartswitch of interest, TSC 116 or a related entity may use obtained topology information to determine that a TGA should be located or placed external to the DPU or smartswitch of interest, but that a TMA should be located or placed on the smartswitch of interest or the same smartswitch that includes the DPU of interest.

In step 203, TSC 116 or a related entity may generate agent deployment information indicating locations for deploying various TSAs 118 and may send or provide the agent deployment information to TSAC 120. In some embodiments, agent deployment information may include instructions (e.g., an executable script, a set of commands, etc.) for placing (e.g., inserting, deploying, or provisioning) TSAs 118 in and around network 114 of environment 100. In some embodiments, agent deployment information may include instructions or other information for causing an entity (e.g., TSAC 120) to place or deploy TSAs 118 in and around network 114 of environment 100. For example, agent deployment information may include smartswitch affinity information, a smartswitch identifier, or a DPU identifier indicating to TSAC 120 where TSA 118 should be placed.

In step 204, TSAC 120 or a related entity may receive the agent deployment information and use the agent deployment information to generate instructions for placing or deploying various TSAs 118 in or around network 114 of environment 100.

In step 205, one of TSAs 118 may be deployed or placed on a device or platform external to network 114. For example, TSAC 120 or a related entity may send instructions or other information (e.g., an executable file) to a programmable switch device located outside of network 114 and may instruct the programmable switch device to implement TSA 118. In this example, TSA 118 may act as a TGA when a test session is initiated, e.g., by sending test traffic to SS 104 and/or SS 106 via network 114.

In step 206, one or more of TSAs 118 may be deployed or placed on nodes (e.g., programmable switch devices) in network 114. For example, TSAC 120 or a related entity may send instructions or other information (e.g., an executable file) to multiple programmable switch devices in network 114 and may instruct the programmable network devices to implement TSAs 118 in network 114. In this example, TSAs 118 may act as a TGA or TMA when a test session is initiated, e.g., by sending test traffic to SS 104 and/or SS 106 via network 114 or by observing traffic to or from SS 104 and/or SS 106 traversing network 114.

In step 207, one of TSAs 118 may be deployed or placed on a device or platform that is external to SS 104 and SS 106. For example, TSAC 120 or a related entity may send instructions or other information (e.g., an OS or virtual container image) to a server and may instruct the server to implement TSA 118 (e.g., a test analysis agent). In this example, various TSAs 118 may periodically or aperiodically send test results or feedback information to TSA 118 acting as a test analysis agent.

In step 208, TSAs 118 may be deployed or placed on SS 104 and SS 106. For example, TSAC 120 or a related entity may send instructions (e.g., commands) or other information to SS 104 for implementing TSA 118 using one or more DPUs 108.

It will be appreciated that FIG. 2 and steps 201-208 are for illustrative purposes and that different and/or additional actions may be performed when placing or deploying TSAs 118 in environment 100 and, moreover, that steps 201-208 or related actions may be performed by different entities than those depicted in FIG. 2.

Figure 3:
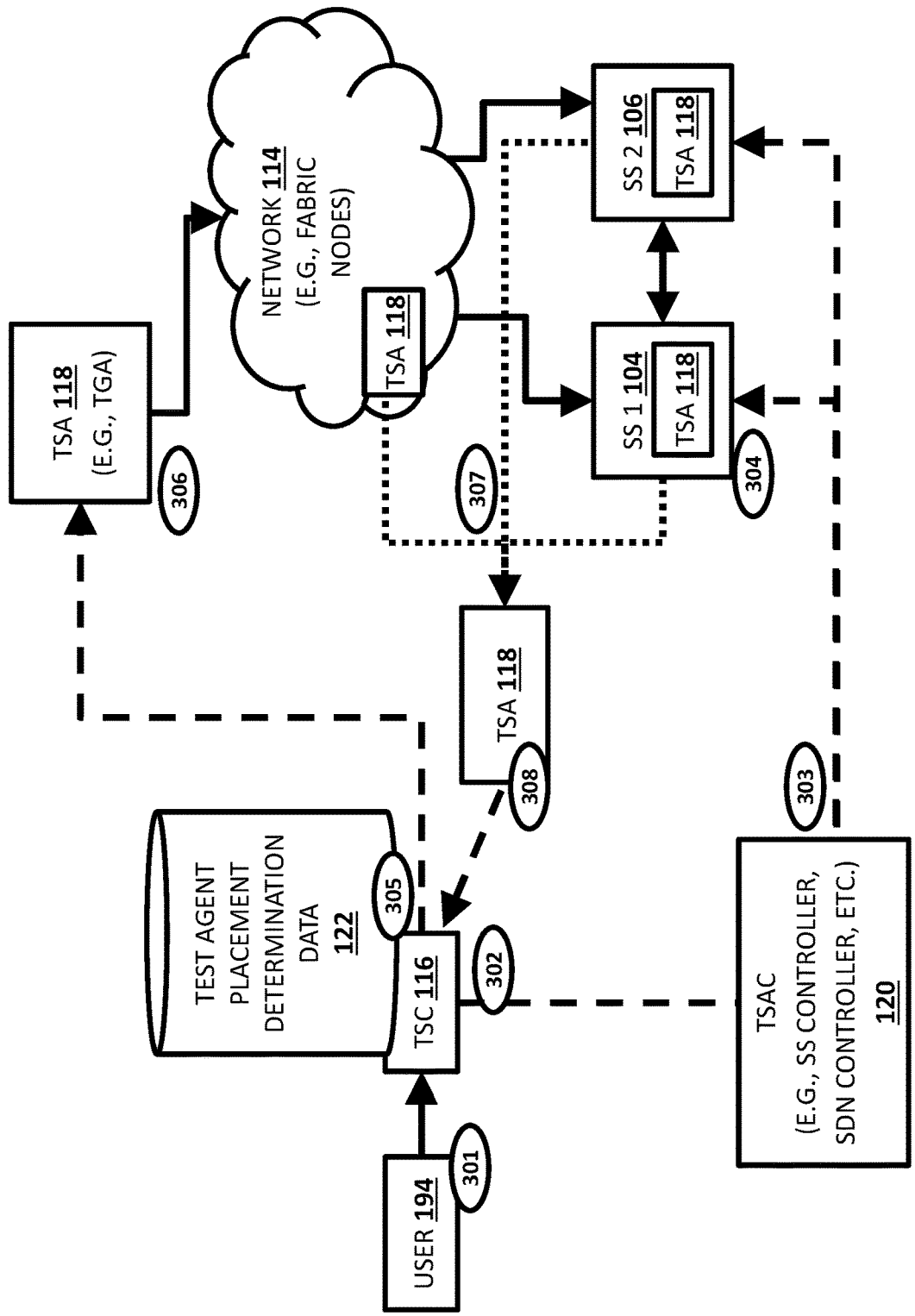
FIG. 3 illustrates an example scenario where a test is executed involving a smartswitch computing environment.

FIG. 3 illustrates an example scenario 300 where a test is executed involving smartswitch computing environment 100. In some embodiments, after or during placement of TSAs 118 in environment 100, test system 102 may configure a SUT or other entity to interact with one or more appropriately located TSA(s) 118, e.g., one TSA 118 (e.g., a test analysis agent) may be implemented using a node, device, or platform external to SS 104 and SS 106 and another TSA 118 (e.g., a TMA) may be implemented on SS 104 and/or SS 106. In this example, TSC 116, and/or TSAC 120 (e.g., an SDN controller, a smartswitch controller, etc.) may be used to send instructions for configuring SS 104 and SS 106 to expose internal smartswitch traffic or other traffic to one or more TSA(s) 118 via one or more physical port(s) (e.g., a front panel port).

In some embodiments, e.g., prior to executing a test session, test system 102 may be configured for presenting or providing user 194 with instructions for cabling port(s) of a device executing a placed TSA 118 to appropriate physical port(s) (e.g., a front panel port) of a monitored smartswitch (e.g., SS 104). For example, test system 102 or a related entity may use preconfigured or known connection data indicating which internal smartswitch traffic is exposed via which physical ports of a smartswitch to generate and provide appropriate cabling instructions.

In some embodiments where test system 102 or a related entity (e.g., TSA 118) and a smartswitch's physical ports (e.g., front panel or back panel ports) are connected to a software configurable patch panel device (e.g., a cross-connect device), test system 102 or a related entity may communicate directly with the software configurable patch panel device for automatically connecting the monitoring system port(s) to the appropriate smartswitch's physical port(s).

Referring to scenario 300, in step 301, e.g., during test session configuration, user 194 (e.g., a test system operator) may provide agent deployment goals or other information to TSC 116. In some embodiments, after receiving user information, TSC 116 may select or determine appropriate locations for TSAs 118 and may also configure or set up nodes or entities in environment 100 such that DPU traffic or internal traffic of SS 104 and/or SS 106 can be forwarded to various entities, e.g., an external TSA 118.

In step 302, TSC 116 may generate instructions for exposing internal smartswitch traffic to one or more TSA(s) 118 (e.g., an external analyzer node for generating metrics and reporting results associated with the DPU traffic). In some embodiments, the generated instructions for exposing internal smartswitch traffic (e.g., traffic sent to, monitored by, or generated by TSA 118) may be sent to an intermediate entity (e.g., TSAC 120, a DPU traffic exposure module, etc.), where the intermediate entity may use the instructions to generate and/or provide switching rules or other instructions for exposing internal smartswitch traffic to one or more TSA(s) 118.

In step 303, TSAC 120 may generate (e.g., using instructions or data from TSC 116) one or more switching rules (e.g., routing rules) or rule updates for updating or configuring a monitored smartswitch (e.g., SS 104 and/or SS 106) to expose internal traffic (e.g., DPU traffic monitored by TSA 118 implemented on SS 104 or feedback messages from or to TSA 118 implemented on SS 104) to an external entity, e.g., TSA 118 acting as a test analysis agent. For example, where SS 104 is a SONiC based device, TSAC 120 (e.g., a DPU traffic exposure module executing on SS 104 or a separate device) may generate one or more switching rules, routing rules, or rule updates, e.g., via the use of SONiC configuration commands, SDN rule update commands, etc.

In step 304, SS 104 may receive and process rules or rule updates, e.g., using standard SDN rule updating mechanisms, to cause traffic associated with a particular DPU (e.g., DPU B) to be exposed to one or more TSAs 118. For example, where SS 104 is a SONiC based device, SONiC based instructions may cause SS 104 or switch processor 110 therein to modify or update one or more entries in its internal routing table. In this example, the routing table of SS 104 may be modified such that traffic flowing between switch processor 110 of SS 104 and DPU B is effectively redirected to an internal TSA 118 executing on DPU C. Continuing with this example, the modified routing table of SS 104 may include rules that direct post-processed traffic received from the internal TSA 118 to DPU B and may also include rules such that traffic or feedback information (e.g., from internal TSA 118) is directed to physical port(s) on SS 104 (e.g., a front panel port) for processing by an external TSA 118 acting as a test analysis agent.

In step 305, TSC 116 or TSAC 120 may send instructions to TSA 118 acting as a TGA for generating and sending test traffic (e.g., workloads) to DPU B and/or other DPUs of SS 104. In some embodiments, TSC 116 or TSAC 120 may also configure or instruct TSA(s) 118 acting as TG(s) to send feedback or report information to an external TSA 118 acting as a test analysis agent or to another test related entity.

In step 306, after receiving instructions from TSC 116, TSA 118 acting as a TGA may generate and send test traffic (e.g., workloads) toward SS 104 via network 114. Traffic destined for DPU B of SS 104 may arrive at switch processor 110 of SS 104 and may be forwarded or redirected (e.g., via the modified routing/switching rules) to an internal TSA 118 executing on DPU C or may be forwarded or redirected to an external TSA 118, e.g., via out one or more physical port(s) of SS 104.

In some embodiments, internal smartswitch traffic that is exposed to test system 102 or element thereof may be limited to particular messages or types of traffic. For example, rules or rule updates received and implemented by SS 104 may cause only test traffic, non-test traffic, intra-switch traffic, inter-switch traffic, DPU-DPU traffic, or HA related traffic to be redirected to TSA 118 for analysis.

In some embodiments, an internal TSA 118 (e.g., implemented in SS 104 or 106) may be configured for observing and/or processing internal smartswitch traffic (e.g., packets addressed to or destined for DPU B via switch processor 110) and returning the processed traffic to at least one virtual port or link (e.g., a VLAN identifier or an internal identifier) of a monitored smartswitch (e.g., SS 104). In such embodiments, a routing table of SS 104 may include rules that direct post-processed traffic received from the internal TSA 118 to an appropriate DPU (e.g., DPU B).

In some embodiments, an external TSA 118 (e.g., a TMA) may be configured for observing and/or processing internal smartswitch traffic (e.g., packets addressed to or destined for DPU C via switch processor 110) and returning the processed traffic to at least one physical port (e.g., the same or a different front panel port) of a monitored smartswitch (e.g., SS 104). In such embodiments, a routing table of SS 104 may include rules that direct post-processed traffic received from the external TSA 118 to an appropriate DPU (e.g., DPU B).

In some embodiments, e.g., by using switching or routing rules for exposing DPU traffic to an external TSA 118, the external TSA 118 may be located at any IP-reachable switch in network 114 (e.g., a datacenter fabric) or the internet and, as such, the external TSA 118 does not have to be physically connected to or co-located with SS 202 and SS 204 and can use remote mirroring techniques to observe DPU related traffic. For example, an external TSA 118 or other test or monitoring equipment may be remotely and/or centrally located, and can be "inserted" into the test path by using suitable switching/routing rules and generic routing encapsulation (GRE), network virtualization using GRE (NVGRE), virtual extensible local area network (VxLAN), or other encapsulation and/or virtualization techniques. In this example, to mitigate potential routing issues, DPUs 108 or switch processor 110 may encapsulate packets and/or use a tunneling protocol to provide traffic destined for the external TSA 118.

In step 307, an external TSA 118 (e.g., a test analysis agent) may receive traffic (e.g., internal smartswitch traffic or feedback messages) from various entities (e.g., TSAs placed in network 114 or implemented on SS 104 and SS 106) located in environment 100.

In some embodiments, an external TSA 118 may be directly cabled to a physical port (e.g., front panel port '2') of SS 104 or it may be indirectly connected to a physical port (e.g., front panel port '2') of SS 104 via an intermediate network, e.g., LAN, WAN, etc. In such embodiments, if the external TSA 118 is configured to receive and process internal switch traffic directly then, after processing and/or analysis, the external TSA 118 may subsequently provide or send the traffic back to SS 104 via the same physical port it was received on or via another physical port.

In step 308, data (e.g., traffic metrics, performance metrics, flow records, notifications, alarms, alerts, metadata, etc.) associated with the observed traffic collected or generated by external TSA 118 acting as a test analysis agent may be provided to various entities e.g., user 194, test system 102, TSC 116, or other entities. For example, after reports are generated by an external TSA 118 acting as a test analysis agent and stored in data storage 122, test results may be made available to user 194 via a GUI provided by TSC 116 or another entity.

In some embodiments, flow records, reports, notifications, alarms, alerts, or results may be generated by an external TSA 118 (e.g., a test analysis agent) or another entity, e.g., using data received from or generated by various TSAs 118 located in environment 100 and/or based on analysis of the observed traffic.

It will be appreciated that FIG. 3 and steps 301-308 are for illustrative purposes and that different and/or additional actions may be performed when executing tests involving placed TSAs 118 in environment 100 and, moreover, that steps 301-308 or related actions may be performed by different entities than those depicted in FIG. 3.

FIG. 4 illustrates example placement determination data 400 usable for determining locations for placing or inserting TSA(s) 118 in environment 100. In some embodiments, placement determination data 400 or portions or variations thereof may be accessed and/or stored by TSC 116, TSAC 120, SS 104, SS 106, and/or other entities using one or more data structures or storage devices, e.g., data storage 122.

In some embodiments, placement determination data 400 may include any suitable information for selecting or determining one or more locations for placing at least one TSA 118 in a test environment, e.g., environment 100. For example, placement determination data 400 may include user-provided preferences or other user related information, e.g., one or more agent deployment factors. In some embodiments, agent deployment factors may include target system requirements (e.g., a DPU having particular amounts of various resources, a smartswitch having at least one DPU in a HA configuration, etc.); optimization goals or test objectives (e.g., minimize DPU monitoring traffic between external links); usage effects (e.g., add TSA 118 only if target system resources are sufficient for both TSA 118 and other workloads); or preferences (e.g., a location preference or a target system preference).

In some embodiments, placement determination data 400 may include information about a SUT or a related test environment (e.g., environment 100), e.g., predetermined or dynamically obtained topology information. In some embodiments, topology information may include or indicate smartswitch location information, peer DPU information, connection information, fabric information, port information, bandwidth information, supported protocol information, or link information.

Referring to FIG. 4, placement determination data 400 may be depicted using a table representing associations between agent deployment factors (e.g., a testing goal, a device or DPU affinity or preference, a usage effect, etc.), SUT related data (e.g., topology data of environment 100 or a SUT (e.g., a target system) therein, port or connection data, etc.), and agent deployment information (e.g., a device identifier, a DPU identifier, instructions commands, an executable script, etc.). For example, each row or association may represent a relationship indicating that particular agent deployment factors and SUT related data yield corresponding agent deployment information indicating one or more locations (e.g., target systems like SS 104 or DPU C) to place one or more TSA(s) 118.

An agent deployment factor may include any suitable information for affecting a placement determination and/or a TSA type to use for one or more test session(s). For example, for a given test session, a test operator may input or select one or more placement factors for consideration (e.g., by test system 102, TSC 116, TSAC 120, or an agent deployment module) when determining one or more locations (e.g., target systems) to place one or more TSA(s) 118. In this example, multiple related factors may be uniquely identified by a factor group identifier (e.g., group '1', group '2', or group '3').

SUT related information may include any suitable information for defining or describing a SUT, a test environment, test system 102, potential target system or other related information and may be usable for selecting a location for deploying TSA(s) 118 for one or more test session(s). For example, for a given test session, a test operator may input or select a network topology or test link information indicating how test system 102 or other entities are connected to a SUT, e.g., SS 104 and/or 106. In this example, a test related topology may be dynamic or software based and, as such, some connections or test traffic forwarding may be adjustable, e.g., without physical re-cabling.

In some embodiments, SUT related information (also referred to herein as topology information) may include or indicate smartswitch location information (e.g., an IP address and port number associated with SS 104); peer DPU information (e.g., a DPU identifier or a network address indicating a peer DPU for a given DPU); connection information (e.g., link identifiers indicating connections between various test system entities and a SUT); fabric information (e.g., information about fabric configuration, tier members, or related data); port information (e.g., port number(s) for identifying traffic to or from a particular DPU); bandwidth information (e.g., link and/or device bandwidths), supported protocol information (e.g., protocols that DPUs or particular devices can process), or link information (e.g., bandwidth, latency, length, medium or type, or other information associated with one or more links in environment 100).

Agent deployment information may include any suitable information for indicating one or more locations for deploying one or more TSA(s) 118 for one or more test session(s). For example, for a given test session, test system 102 or a related entity (TSC 116, TSAC 120, or an agent deployment module) may determine a target system to install and execute TSA 118 based on one or more agent deployment factors (e.g., test goals or other user input) and knowledge of the test environment or the SUT (e.g., SS 104 or DPU(s) therein).

In some embodiments, agent deployment information may include or indicate a type or kind of TSA, e.g., TSA 118 may be a TGA or a traffic generator (TG), a stop test execution agent, a traffic probe, a TMA, a traffic analysis agent, or a test analysis agent.

In some embodiments, agent deployment information may include or indicate location data (e.g., a target system identifier (e.g., an IP address or media access control (MAC) address, port number, etc.), instructions (e.g., information that can cause an orchestrator (e.g., TSAC 120) to insert and/or setup TSA 118 on a target system), commands (e.g., API commands for setting up and/or initializing TSA 118 on a target system), a deployable executable (e.g., a virtual container, a virtual machine, or other executable file for implementing or executing TSA 118 on a target system), or a configuration script (e.g., a script for installing or configuring TSA 118 on a target system).

It will be appreciated that placement determination data 400 in FIG. 4 is for illustrative purposes and that different and/or additional information may also be stored or maintained. Further, it will be appreciated placement determination data 400 or related data may be stored in various data structures, memories, media, and/or in one or more locations.

Figure 5:
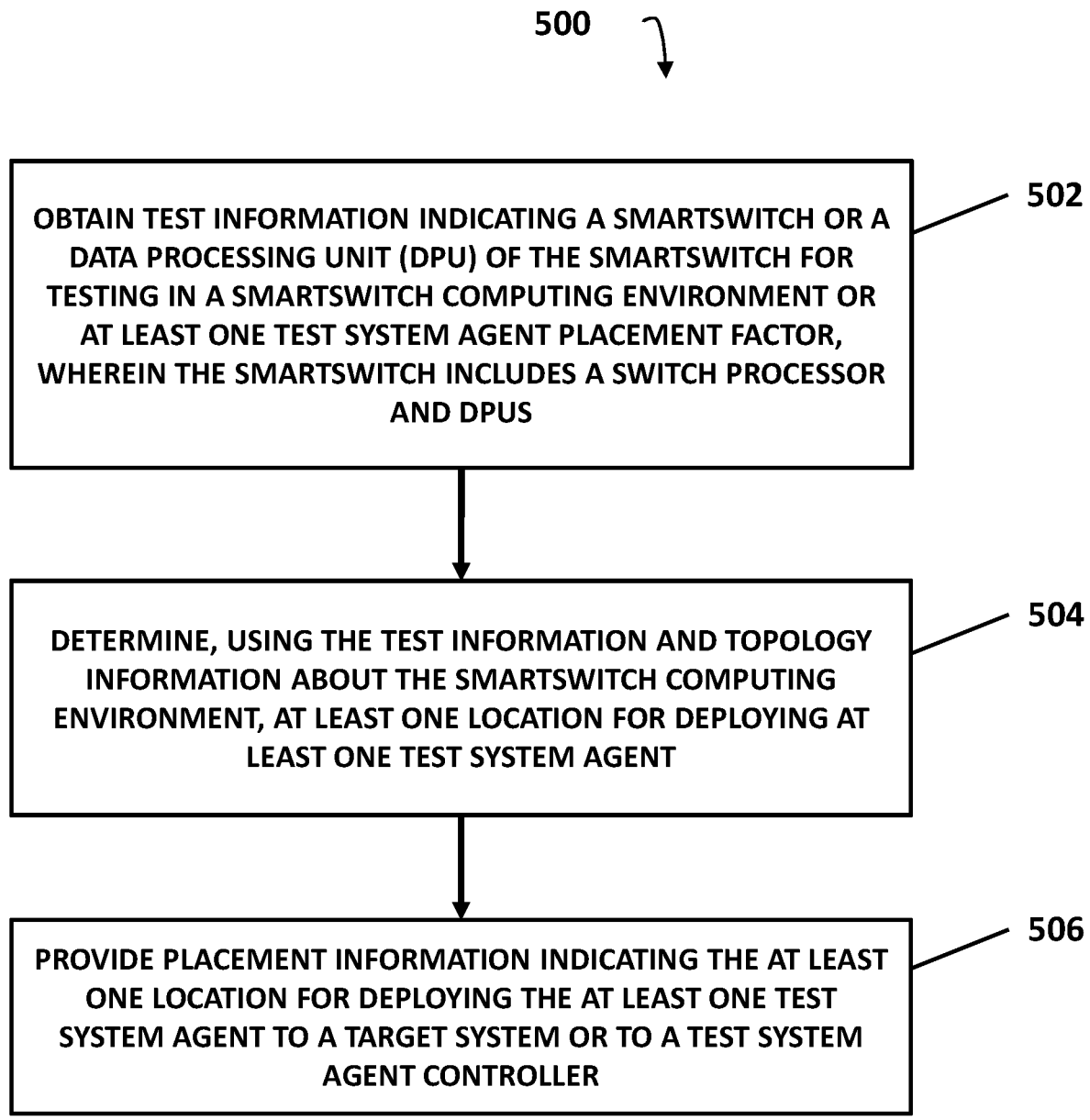
FIG. 5 is a diagram illustrating an example process for test system agent deployment in a smartswitch computing environment.

FIG. 5 is a diagram illustrating an example process 500 for test system agent deployment in a smartswitch computing environment. In some embodiments, process 500, or portions thereof, may be performed by or at test system 102, TSC 116, TSAC 120, a configuration device, a user device, and/or another node or module. In some embodiments, process 500 may include steps 502, 504, and 506.

Referring to process 500, in step 502, test information may be obtained. In some embodiments, test information may indicate a smartswitch (e.g., SS 104) or a DPU (e.g., DPU 108) of the smartswitch for testing in a smartswitch computing environment (e.g., environment 100) and/or at least one test system agent deployment factor (e.g., a resource usage goal, a target system affinity or preference, or other preference). In some embodiments, a smartswitch (e.g., SS 104 or 106) may include a switch processor (e.g., switch processor 110 or 112) and DPUs (e.g., DPUs 108 or 109). For example, SS 104 may utilize switch processor 110 to forward a particular traffic flow to one of DPUs 108 that lack direct externally-accessible links or connections.

In step 504, it may be determined, using the test information and topology information (e.g., placement determination data 400) about the smartswitch computing environment, at least one location (e.g., a device, a node, a DPU, or a computing platform) for deploying at least one test system agent.

In some embodiments, determining at least one location for deploying at least one test system agent (e.g., TSA 118) includes providing, via a display and to a user, multiple potential locations for deploying the at least one test system agent, and receiving, via a user interface and from the user, the information indicating the at least one location for deploying the at least one test system agent.

In step 506, placement information (e.g., location information, instructions, commands, a deployable executable, a configuration script, etc.) indicating the at least one location for deploying the at least one test system agent may be provided to a target system (e.g., SS 104, DPU 108, a computing device or platform, etc.) or to a test system agent controller (e.g., TSAC 120). For example, test system 102 or TSC 116 may send instructions for inserting, setting up, and/or configuring TSA 118 to a target system (e.g., a device that executes TSA 118) or TSAC 120. In this example, the target system or TSAC 120 may set up, insert, or implement TSA 118 at an appropriate target system (e.g., a device or module selected using a test related goal and/or other user-provided placement factors) for use during one or more tests.

In some embodiments, e.g., after TSA(s) 118 are configured and/or implemented for testing in environment 100, a test system or another entity (e.g., TSC 116 or TSA 118 acting as a traffic generator) may initiate a test involving the at least one test system agent (e.g., TSA(s) 118) and the smartswitch computing environment.

In some embodiments, a target system may include a first smartswitch (e.g., SS 104), a first DPU of the first smartswitch (e.g., DPU A), a second DPU of the first smartswitch (e.g., DPU B), a second smartswitch (e.g., SS 106), a second DPU of the second smartswitch (e.g., DPU G), TSC 116, a network device, a switching device, a server, a test device, a network tap, a traffic generation device, a traffic analysis device, a traffic monitoring device, a virtual container, or a virtual machine.

In some embodiments, test system agent controller (e.g., TSAC 120) may include or interact with a smartswitch controller, a network packet broker (NPB), a NPB controller, a software defined network (SDN) controller, or a controller module of a test system.

In some embodiments, at least one test system agent deployment factor may include a target system requirement, a predicted SUT resource usage value, a predicted bandwidth consumption value, a predicted latency value, a predicted memory consumption value, a predicted shared resource balance value, minimizing external inter-smartswitch link bandwidth consumption by test related traffic, minimizing smartswitch internal fabric link bandwidth consumption by test related traffic, minimizing congestion or queue depth of a smartswitch or a switch processor (e.g., a switching ASIC or programmable switch) thereof, minimizing CPU utilization, minimizing DPU utilization, minimizing memory consumption, minimizing electrical power consumption, maximizing sustainability (e.g., regarding power usage, resources, costs, uptime, system maintenance, etc.), or determining that a target system is capable of performing its expected workload in addition to implementing the at least one test system agent.

In some embodiments, at least one test system agent (e.g., TSA 118) may include a TGA, a stop test execution agent, a traffic probe, a TMA, a traffic analysis agent, or a test analysis agent.

In some embodiments, at least one test system agent may include multiple TSAs 118 where one or more of TSAs 118 is implemented using a smartswitch or a DPU of the smartswitch. For example, a first TSA 118 may include a TGA implemented on DPU A of SS 104 and a TSA 118 may include a stop test execution agent, a traffic probe, a TMA, a traffic analysis agent, or a test analysis agent implemented on DPU C of SS 104.

In some embodiments, topology information (e.g., placement determination data 400) may include or indicate smartswitch location information, peer DPU information, connection information, fabric information, port information, bandwidth information, supported protocol information, or link information.

It will be appreciated that process 500 is for illustrative purposes and that different and/or additional actions may be used. It will also be appreciated that various actions described herein may occur in a different order or sequence.

It should be noted that test system 102, TSC 116, TSAC 120, an agent deployment module, and/or functionality described herein may constitute one or more special purpose computing devices. Further, test system 102, TSC 116, TSAC 120, an agent deployment module, and/or functionality described herein can improve the technological field of testing networks and related nodes by providing mechanisms, systems, methods, and/or techniques for test system agent deployment in a smartswitch computing environment. For example, test system 102 or a related entity may utilize placement factors (e.g., target system requirements) and other information (e.g., SUT or test environment topology information) in determining optimized locations for one or more TSA(s) 118, e.g., appropriate locations that meet or satisfy user-specified placement factors and/or are applicable for a given test environment and/or test scenario.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for test system agent deployment in a smartswitch computing environment, the system comprising:
   at least one processor; and
   a memory; and
   a test system implemented using the at least one processor and the memory, the test system configured for:
   obtaining test information indicating a smartswitch or a data processing unit (DPU) of the smartswitch for testing in a smartswitch computing environment or at least one test system agent deployment factor, wherein the smartswitch includes a switch processor and DPUs;
   determining, using the test information and topology information about the smartswitch computing environment, at least one location for deploying at least one test system agent; and
   providing placement information indicating the at least one location for deploying the at least one test system agent to a target system or to a test system agent controller.

2. The system of claim 1 wherein the test system is configured for:
   initiating a test involving the at least one test system agent and the smartswitch computing environment.

3. The system of claim 2 wherein the test system is configured for:
   using feedback from the at least one test system agent to generate or report test result information.

4. The system of claim 1 wherein the test system is configured for:
   providing, via a display and to a user, multiple potential locations for deploying the at least one test system agent; and
   receiving, via a user interface and from the user, the information indicating the at least one location for deploying the at least one test system agent.

5. The system of claim 1 wherein the target system includes the DPU, the smartswitch, a second DPU of the smartswitch, a second smartswitch, a second DPU of the second smartswitch, a test system controller, a network device, a switching device, a server, a test device, a network tap, a traffic generation device, a traffic analysis device, a traffic monitoring device, a virtual container, or a virtual machine.

6. The system of claim 1 wherein the test system agent controller includes a smartswitch controller, a network packet broker (NPB), a NPB controller, a software defined network (SDN) controller, or a controller module of the test system.

7. The system of claim 1 wherein the at least one test system agent deployment factor includes a target system requirement, a predicted system under test (SUT) resource usage value, a predicted bandwidth consumption value, a predicted latency value, a predicted memory consumption value, a predicted shared resource balance value, minimizing external inter-smartswitch link bandwidth consumption by test related traffic, minimizing smartswitch internal fabric link bandwidth consumption by test related traffic, minimizing congestion or queue depth of the smartswitch or a switch processor thereof, minimizing smartswitch CPU utilization, minimizing smartswitch DPU utilization, minimizing smartswitch memory consumption, minimizing electrical power consumption, maximizing sustainability, or determining that the target system is capable of performing its expected workload in addition to implementing the at least test one system agent.

8. The system of claim 1 wherein the at least one test system agent includes a traffic generator, a traffic generation agent, a stop test execution agent, a traffic probe, a traffic monitoring agent, a traffic analysis agent, or a test analysis agent.

9. The system of claim 1 wherein the at least one test system agent includes multiple test system agents, wherein one or more of the multiple test system agents is implemented using the smartswitch or the DPU of the smartswitch.

10. The system of claim 1 wherein the topology information indicates smartswitch location information, peer DPU information, connection information, fabric information, port information, bandwidth information, supported protocol information, or link information.

11. A method for test system agent deployment in a smartswitch computing environment, the method comprising:
at a test system:
obtaining test information indicating a smartswitch or a data processing unit (DPU) of the smartswitch for testing in a smartswitch computing environment or at least one test system agent deployment factor, wherein the smartswitch includes a switch processor and DPUs;
determining, using the test information and topology information about the smartswitch computing environment, at least one location for deploying at least one test system agent; and
providing placement information indicating the at least one location for deploying the at least one test system agent to a target system or to a test system agent controller.

12. The method of claim 11 comprising:
at the test system:
initiating a test involving the at least one test system agent and the smartswitch computing environment.

13. The method of claim 11 wherein determining the at least one location for deploying at least one test system agent includes providing, via a display and to a user, multiple potential locations for deploying the at least one test system agent; and receiving, via a user interface and from the user, the information indicating the at least one location for deploying the at least one test system agent.

14. The method of claim 11 wherein the target system includes the DPU, the smartswitch, a second DPU of the smartswitch, a second smartswitch, a second DPU of the second smartswitch, a test system controller, a network device, a switching device, a server, a test device, a network tap, a traffic generation device, a traffic analysis device, a traffic monitoring device, a virtual container, or a virtual machine.

15. The method of claim 11 wherein the test system agent controller includes a smartswitch controller, a network packet broker (NPB), a NPB controller, a software defined network (SDN) controller, or a controller module of the test system.

16. The method of claim 11 wherein the at least one test system agent deployment factor includes a target system requirement, a predicted system under test (SUT) resource usage value, a predicted bandwidth consumption value, a predicted latency value, a predicted memory consumption value, a predicted shared resource balance value, minimizing external inter-smartswitch link bandwidth consumption by test related traffic, minimizing smartswitch internal fabric link bandwidth consumption by test related traffic, minimizing congestion or queue depth of the smartswitch or a switch processor thereof, minimizing CPU utilization, minimizing DPU utilization, minimizing memory consumption, minimizing electrical power consumption, maximizing sustainability, or determining that the target system is capable of performing its expected workload in addition to implementing the at least one test system agent.

17. The method of claim 11 wherein the at least one test system agent includes a traffic generator, a traffic generation agent, a stop test execution agent, a traffic probe, a traffic monitoring agent, a traffic analysis agent, or a test analysis agent.

18. The method of claim 11 wherein the at least one test system agent includes multiple test system agents, wherein one or more of the multiple test system agents is implemented using the smartswitch or the DPU of the smartswitch.

19. The method of claim 11 wherein the topology information indicates smartswitch location information, peer DPU information, connection information, fabric information, port information, bandwidth information, supported protocol information, or link information.

20. A non-transitory computer readable medium having stored thereon executable instructions embodied in the non-transitory computer readable medium that when executed by at least one processor of a computing device cause the computing device to perform steps comprising:
obtaining test information indicating a smartswitch or a data processing unit (DPU) of the smartswitch for testing in a smartswitch computing environment or at least one test system agent deployment factor, wherein the smartswitch includes a switch processor and DPUs;
determining, using the test information and topology information about the smartswitch computing environment, at least one location for deploying at least one test system agent; and
providing placement information indicating the at least one location for deploying the at least one test system agent to a target system or to a test system agent controller.

* * * * *